United States Patent
Kobayashi et al.

[11] Patent Number: 6,063,489
[45] Date of Patent: May 16, 2000

[54] MAGNETIC RECORDING MEDIUM COMPRISING A MIXED MAGNETIC REGION HAVING A THICKNESS RELATIVE TO THE TOTAL THICKNESS OF MAGNETIC LAYERS

[75] Inventors: Hideyuki Kobayashi; Hidehiko Nakayama; Kazutaka Yamashita; Akira Ishikawa, all of Tochigi-ken, Japan

[73] Assignee: Kao Corporation, Tokyo, Japan

[21] Appl. No.: 09/129,891

[22] Filed: Aug. 6, 1998

[30] Foreign Application Priority Data

Aug. 7, 1997 [JP] Japan .................................. 9-213704

[51] Int. Cl.[7] ........................................................ B32B 5/16
[52] U.S. Cl. .......................... 428/328; 428/329; 428/336; 428/693; 428/694 BA; 428/694 BM; 428/694 BN; 428/699; 428/701; 428/702
[58] Field of Search ..................................... 428/323, 328, 428/694 BA, 329, 336, 693, 694 BN, 694 BM, 699, 701, 702

[56] References Cited

U.S. PATENT DOCUMENTS

| | | |
|---|---|---|
| 4,784,895 | 11/1988 | Mizuno et al. ............................ 428/42 |
| 5,384,182 | 1/1995 | Ito et al. .................................. 428/212 |
| 5,494,732 | 2/1996 | Ito et al. .................................. 428/212 |
| 5,547,772 | 8/1996 | Saito et al. ........................... 428/694 B |
| 5,827,600 | 10/1998 | Ejiri et al. ................................ 428/141 |

FOREIGN PATENT DOCUMENTS 8-180376  7/1996  Japan .

*Primary Examiner*—Hoa T. Le
*Attorney, Agent, or Firm*—Oblon, Spivak, McClelland, Maier & Neustadt, P.C.

[57] ABSTRACT

A magnetic recording medium having a lower magnetic layer 3 and an upper magnetic layer 4 is disclosed, wherein the lower magnetic layer 3 contains tabular magnetic particles and acicular nonmagnetic inorganic particles and has a thickness of 0.5 to 2.5 $\mu$m, the tabular magnetic particles being oriented with their plane having the longest diameter tilted at an angle of 70 to 90° in average with the plane of the magnetic recording medium, the upper magnetic layer 4 contains acicular magnetic particles and has a thickness of not greater than 0.3 $\mu$m, and a mixed magnetic region 6 which comprises tabular magnetic particles and acicular magnetic particles, mixed together, and formed between the upper and lower magnetic layers, a thickness m of the mixed magnetic region 6 being 1 to 20% of the total thickness T of all the magnetic layers.

5 Claims, 1 Drawing Sheet

MAGNETIC RECORDING MEDIUM COMPRISING A MIXED MAGNETIC REGION HAVING A THICKNESS RELATIVE TO THE TOTAL THICKNESS OF MAGNETIC LAYERS

BACKGROUND OF THE INVENTION

1. Field of the Invention

This invention relates to a magnetic recording medium which has high output characteristics and a low noise level and is suitable for high-density recording.

2. Discussion of the Background

As the demand for higher recording density in magnetic recording media of a coated type has been increasing, multi-layered magnetic recording media of a coated type comprising a substrate having provided thereon a plurality of coating layers have been manufactured and sold as high-density recording media.

A magnetic recording medium having a lower magnetic layer containing tabular magnetic particles having a relatively small coercive force and an upper magnetic layer containing acicular magnetic particles is disclosed in Japanese Patent Laid-Open No. 8-180376. The disclosed magnetic recording medium is capable of recording short wavelength signals (e.g., 0.41 $\mu$m) on the upper layer and long wavelength signals (e.g., 1.8 $\mu$m) on the lower layer, thereby exhibiting excellent performance in recording and out-put characteristics over a full range of from long to short wavelengths. However, the latest demand for techniques of high-density recording keeps on increasing to create the necessity of using magnetic powder having a higher coercive force in the lower layer.

In producing a magnetic recording medium having tabular magnetic particles of relatively high coercive force in its lower layer, when a coating layer containing the tabular magnetic particles of high coercive force is subjected, while wet, to magnetic field orientation in the horizontal direction, the tabular magnetic particles react sensitively to the magnetic field applied and are oriented with their plane having the longest diameter perpendicular to the surface of the magnetic recording medium. As a result, the surface of the lower magnetic layer, i.e., the interface between the lower magnetic layer and the upper magnetic layer, becomes rough, and the roughness is reflected to the surface roughness of the upper magnetic layer, i.e., the surface roughness of the magnetic recording medium. Therefore, it is difficult to reduce the surface roughness of a magnetic recording medium (e.g., to 3 nm or smaller) to achieve a high recording density merely by displacing tabular magnetic particles with those having a high coercive force in the lower magnetic layer.

SUMMARY OF THE INVENTION

Accordingly, an object of the present invention is to provide a magnetic recording medium having upper and lower magnetic layers and containing tabular magnetic particles in its lower magnetic layer, which has satisfactory surface smoothness, excellent output (C/N) characteristics (high and low frequency characteristics), and excellent over-write characteristics.

The inventors have found that a mixed region of suitable thickness provided between the upper and lower layers produces such a surprising effect that the output characteristics in the middle to high frequency region are improved. The inventors have also found that the mixed region serves as a buffering region so that the roughness of the upper layer/lower layer interface attributed to the tabular magnetic particles contained in the lower layer is hardly reflected on the surface of the upper layer, whereby a magnetic recording medium with satisfactory surface properties can be obtained.

The object of the present invention is provided for by a magnetic recording medium comprising a non-magnetic substrate having provided thereon a plurality of magnetic layers including a first magnetic layer provided as a top layer and a second magnetic layer adjoining the first magnetic layer, wherein the second magnetic layer comprises tabular magnetic particles and acicular non-magnetic inorganic particles and has a thickness of 0.5 to 2.5 $\mu$m, the tabular magnetic particles being oriented with their plane having the longest diameter tilted at an angle of 70 to 90 in average with the plane of the magnetic recording medium, the first magnetic layer comprises acicular magnetic particles and has a thickness of not greater than 0.3 $\mu$m, and a mixed magnetic region which comprises tabular magnetic particles and acicular magnetic particles, mixed together, and formed between the first magnetic layer and the second magnetic layer, a thickness of the mixed magnetic region being 1 to 20% of the total thickness of all the magnetic layers.

U.S. Pat. No. 4,784,895 proposes a magnetic recording medium having upper and lower magnetic layers with a mixed region therebetween, in which the upper magnetic layer contains magnetic particles having a relatively small particle size and a relatively high coercive force for the purpose of reducing the noise level, and the lower magnetic layer contains magnetic particles having a relatively large particle size and a relatively small coercive force for the purpose of improving output characteristics in the low frequency region. For the purpose of improving output characteristics, the mixed region located between the upper and lower magnetic layers provides continuous changes of coercive force between the two layers. However, according to the specific description on the magnetic recording medium given in this patent, the upper magnetic layer has a thickness of 0.5 $\mu$m or greater, and the lower magnetic layer contains magnetic particles of low coercive force such as iron oxide, etc. Therefore, if the thickness of the upper magnetic layer of the disclosed magnetic recording medium is reduced to 0.3 $\mu$m or less so as to sufficiently fulfill the latest demand on high recording density media, there could be obtained no appreciable improvement in the output characteristics in the middle to high frequency region.

According to the present invention, there is provided a magnetic recording medium having satisfactory surface smoothness and excellent output characteristics in a full frequency range, especially in the middle to high frequency range.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DETAILED DESCRIPTION OF THE PREFERRED EMBODIMENTS

Preferred embodiments of the magnetic recording medium according to the present invention will be described with reference to FIGS. 1 and 2.

Figure 1:
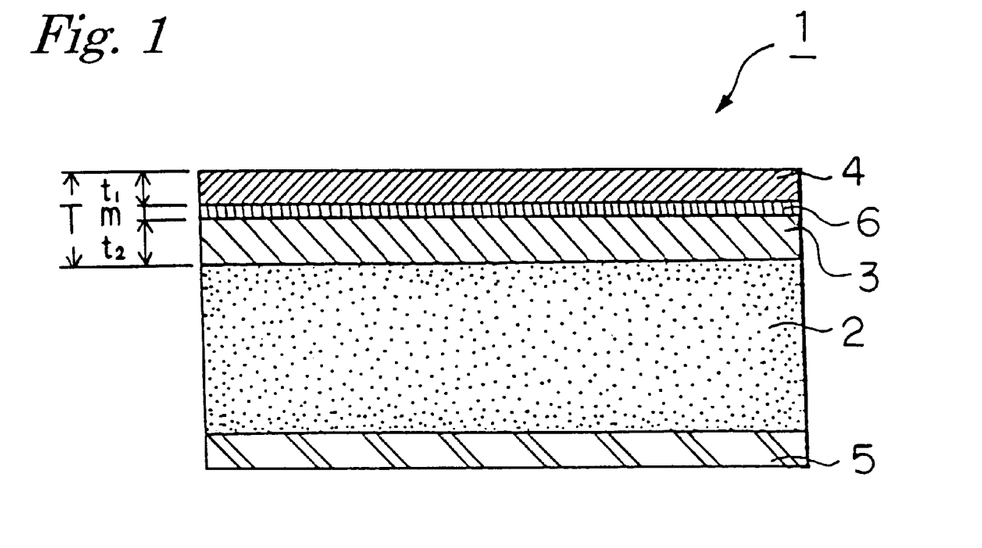
FIG. 1 schematically illustrates the layer structure of a magnetic recording medium according to a preferred embodiment of the present invention, and FIG. 2 schematically illustrates the orientation state of tabular magnetic particles contained in a second magnetic layer.

A magnetic recording medium 1 according to the embodiment shown in FIG. 1 comprises a nonmagnetic substrate 2 having on one side thereof a second magnetic layer 3 and a first magnetic layer 4 as a top layer adjoining the second magnetic layer 3.

On the other side of the nonmagnetic substrate 2 is provided a backcoating layer 5. A mixed magnetic region 6 is formed between the first magnetic layer 4 and the second magnetic layer 3.

The second magnetic layer 3 contains tabular magnetic particles and acicular nonmagnetic particles.

Non-limiting examples of the tabular magnetic particles include ferromagnetic hexagonal ferrite particles. The ferromagnetic hexagonal ferrite particles include barium ferrite and strontium ferrite having a hexagonal plate shape, the Fe atom of which may be partially replaced with other atoms, e.g., Ti, Co, Ni, Zn, V, etc.

Preferred are barium ferrite particles of hexagonal plate shape with part of the Fe atom replaced with Co, Zn and Ti. One or more than one kinds of the tabular magnetic particles can be used. Of the ferromagnetic hexagonal ferrites with part of the Fe atom replaced with the above atoms, those having an Fe substitution of 0.1 to 50% by weight, particularly 1 to 30% by weight, are still preferred. Such particles may be prepared by conventional methods known to those of ordinary skill in the art, without undue experimentation.

In the present invention, the tabular ferromagnetic hexagonal ferrite particles have an axis of easy magnetization in the direction perpendicular to the plane having the longest diameter (hereinafter referred to as a tabular plane). The tabular magnetic particles which can be used preferably have a coercive force (Hc) of 80 to 240 kA/m in the direction perpendicular to the tabular plane and a saturation magnetization ($\sigma$) of 30 to 75 $Am^2/kg$, with the coercive force of 100 to 200 kA/m and the saturation magnetization of 40 to 70 $Am^2/kg$ being particularly preferred. With the coercive force and saturation magnetization falling within the above respective ranges, the lower magnetic layer could achieve satisfactory recording of short wavelength signals, which will lead to satisfactory output characteristics in the middle to high frequency region.

The longest diameter on the tabular plane (hereinafter referred to as a tabular diameter) is preferably 5 to 100 nm, still preferably 10 to 80 nm, and the aspect ratio, i.e., the ratio of the tabular diameter to the thickness, is preferably 2 to 10, still preferably 2 to 7.

Figure 2:
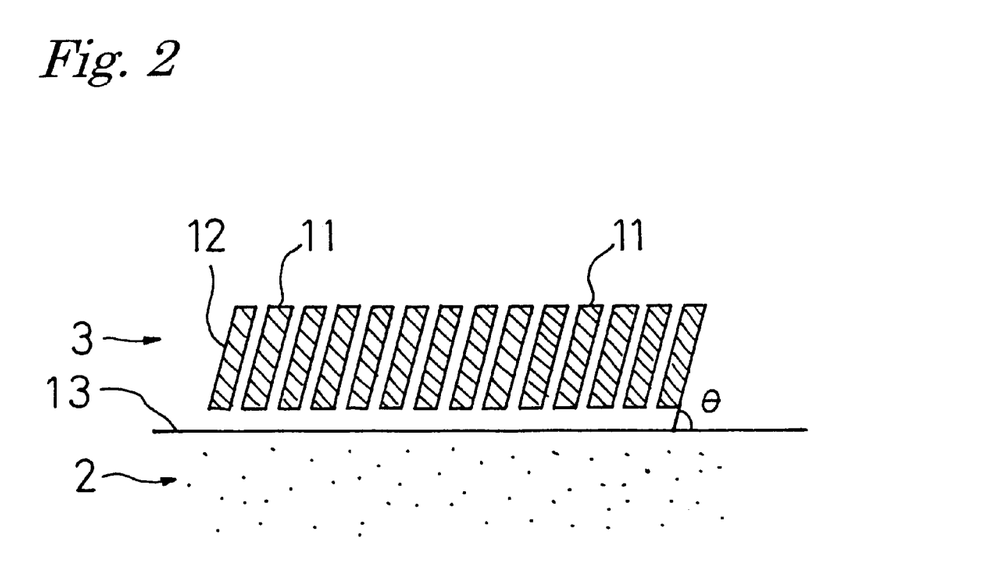

In the second magnetic layer 3, the tabular magnetic particles 11 are oriented with their tabular plane 12 forming an angle of 70 to 90° in average with the plane of the magnetic recording medium as shown in FIG. 2. In other words, the average angle of tilt $\Theta$ formed between the tabular plane 12 and the plane of the magnetic recording medium is from 70 to 90°. Such orientation can be obtained by applying a magnetic field to the wet coating layer of the second magnetic layer 3 containing the tabular magnetic particles in the longitudinal direction of the coating layer.

Such orientation of the tabular magnetic particles secures the output characteristics in the middle to high frequency region in a sufficient level. The term "plane of the magnetic recording medium" as used herein means the surface 13 of the nonmagnetic substrate 2 on which the second magnetic layer 3 is to be formed as well as any plane parallel thereto.

The term "average angle of tilt $\Theta$" as used herein is defined as an angle between the direction in which the squareness ratio (Sq) of a magnetic recording medium becomes the maximum and the direction perpendicular to the plane of the magnetic recording medium, for example, the surface 13 of the nonmagnetic substrate 2. The average angle of tilt $\Theta$ can be determined as follows. The backcoating layer side of a magnetic recording medium is flatly stuck to a nonmagnetic mount with an adhesive resin, and the first magnetic layer is removed by grinding with a precise surface grinder to prepare a sample. The sample is cut to a prescribed shape, e.g., a disk of 10 mm$\phi$, and set on a vibrating-sample magnetometer BHV-VSM (manufactured by Riken Denshi K.K.). A magnetic field is applied to the sample, and the Sq is measured while rotating the Z axis of VSM, and the direction in which the sample has the maximum Sq is determined. The maximum magnetic field applied was 796 kA/m, and a magnetic field was applied for every change of the measuring angle. Because the average angle of tilt $\Theta$ is largely influenced by the drying conditions of the second magnetic layer 3, it varies depending on whether or not the first magnetic layer 4 is formed on the second magnetic layer. Therefore, the measurement of the average angle of tilt $\Theta$ should be made on a finished magnetic recording medium from which the first magnetic layer 4 has been removed. In the present invention, the average angle of the tilt $\Theta$ are expressed in every 5°, like 65°, 70°, 75°, 80°, 85° and 90°.

The second magnetic layer 3 contains the acicular nonmagnetic particles in addition to the tabular magnetic particles. The acicular nonmagnetic particles are necessary in order to obtain a satisfactory mixed state with the acicular magnetic particles originated in the first magnetic layer 4 at the mixed magnetic region 6 formed between the second magnetic layer 3 and the first magnetic layer 4.

The acicular nonmagnetic particles include acicular $\alpha$—$Al_2O_3$, acicular $\gamma$—$Al_2O_3$, acicular $TiO_2$—$Al_2O_3$, acicular $\alpha$—$Fe_2O_3$, acicular $TiO_2$, acicular $3Al_2O_3.2SiO_2$, acicular $La_2O_3$, acicular $Sm_2O_3$, acicular $Tb_4O_7$, and acicular $Eu_2O$, with acicular $\alpha$—$Fe_2O_3$ being preferred. The acicular nonmagnetic particles preferably have a major axis length (r2) of 50 to 500 nm, particularly 60 to 250 nm, and an acicular ratio (a2) of 3 to 20, particularly 4 to 12. The term "acicular particles" includes particles that have a bar shape, an acicular shape, a cigar shape and a spindle shape.

In order to obtain a satisfactory mixed state with the acicular magnetic particles originated in the first magnetic layer 4 in the mixed magnetic region 6, it is preferred that the major axis length (r2) and acicular ratio (a2) of the acicular nonmagnetic particles be approximate to the major axis length (r1) and acicular ratio (a1) of the acicular magnetic particles contained in the first magnetic layer 4, respectively. Specifically, the ratio of the major axis length (r2) of the acicular nonmagnetic particles to the major axis length (r1) of the acicular magnetic particles, r2/r1, is preferably 1 to 3, still preferably 1.5 to 2.5. It is also preferred that the absolute difference between r1 and r2 be within 100 nm, particularly within 50 nm, and that the absolute difference between a1 and a2 be within 3, particularly within 2.

In order to form the mixed magnetic region 6 between the first and second magnetic layers easily and to obtain satisfactory output characteristics in the high frequency region, it is preferred that the ratio of the tabular magnetic particles to the acicular nonmagnetic particles (the former/the latter) be 70/30 to 10/90, particularly 65/35 to 20/80, by weight.

The second magnetic layer 3 may also contain nonmagnetic particles which are not in acicular shape. Examples of such particles include particulate, spherical or amorphous particles of boron nitride, tin dioxide, silicon dioxide, nonmagnetic chromium oxide, alumina, silicon carbide, corundum, nonmagnetic iron oxide, siliceous stone, silicon nitride, carbon black, titanium oxide, barium sulfate and calcium carbonate.

In addition to the tabular magnetic particles, acicular nonmagnetic particles and other nonmagnetic particles, the second magnetic layer 3 may contain other components, such as a binder, a lubricant, and a hardener.

Any binders known to be useful in magnetic recording media can be used. For example, thermoplastic resins, thermosetting resins, reactive resins, and mixtures thereof can be used. Specific examples include vinyl chloride copolymers, modified vinyl chloride copolymers, copolymers of acrylic acid, methacrylic acid or esters thereof, acrylonitrile copolymers (rubbery resins), polyester resins, polyurethane resins, epoxy resins, cellulosic resins, and polyamide resins. The binder preferably has a number average molecular weight (Mn) of 2,000 to 200,000. For the purpose of improving the dispersibility of the magnetic particles, etc., these binders can contain a polarizing functional group, i.e., a polar group, such as a hydroxyl group, a carboxyl group or a salt thereof, a sulfoxyl group or a salt thereof, a phosphoric group or a salt thereof, a nitro group, a nitric ester group, an acetyl group, a sulfuric ester group or a salt thereof, an epoxy group, a nitrile group, a carbonyl group, an amino group, an alkylamino group, an alkylammonium salt group, and a betaine structure, e.g., sulfobetaine or carbobetaine.

The binder is preferably used in an amount of from 5 to 40 parts by weight, in particular from 10 to 35 parts by weight, per 100 parts by weight of the total of the tabular magnetic particles and the acicular nonmagnetic particles.

The lubricants which are generally used include fatty acids and fatty acid esters. Suitable fatty acids include those having a saturated or unsaturated, straight or branched hydrocarbon group having 10 to 28 carbon atoms. Suitable fatty acid esters include alkyl esters of the above fatty acids, with those having 12 to 36 carbon atoms in total being preferred. The lubricant is preferably used in an amount of 1 to 12 parts by weight, particularly 2 to 10 parts by weight, per 100 parts by weight of the total of the tabular magnetic particles and the acicular nonmagnetic particles.

The hardeners which are generally used include amine hardeners and isocyanate hardeners, typically exemplified by Coronate L (produced by Nippon Polyurethane Industry Co., Ltd.). The hardener is preferably used in an amount of 1 to 15 parts by weight, particularly 2 to 10 parts by weight, per 100 parts by weight of the total of the tabular magnetic particles and the acicular nonmagnetic particles.

The second magnetic layer 3 can be formed by coating the nonmagnetic substrate 2 with a magnetic coating composition containing the above-mentioned components dispersed in a solvent (hereinafter referred to as a second magnetic coating composition). Suitable solvents include ketones, esters, ethers, aromatic hydrocarbons, and chlorinated hydrocarbons. The solvent is suitably used in an amount of 80 to 500 parts, preferably 100 to 350 parts, by weight per 100 parts by weight of the total of the tabular magnetic particles and the acicular nonmagnetic particles.

The second magnetic coating composition is prepared by, for example, preliminarily mixing the tabular magnetic particles, acicular nonmagnetic particles, binder, etc. together with a portion of the solvent in a Naughter mixer, etc., kneading the premixture in a continuous pressure kneader, etc., diluting the premixture with another portion of the solvent, followed by dispersing by means of a sand mill, etc., adding to the dispersion, additives, such as a lubricant, filtering the dispersion, and adding thereto the hardener and the remainder of the solvent.

The thickness of the second magnetic layer 3 (thickness $t_2$, see FIG. 1) formed of the second magnetic coating composition is preferably 0.5 to 2.5 $\mu$m, particularly 0.5 to 2.0 $\mu$m. If the thickness $t_2$ is less than 0.5 $\mu$m, the resulting magnetic recording medium has weak bending stiffness. If it exceeds 2.5 $\mu$m, the overwrite characteristics are reduced.

The second magnetic layer 3 preferably has a coercive force (Hc) of 80 to 240 kA/m, particularly 110 to 220 kA/m. If the coercive force is less than the lower limit, although the output in the low frequency region is satisfactory, the output in the high frequency region tends to be insufficient. If the coercive force exceeds the upper limit, the output in the low frequency region tends to be insufficient. Further, the saturation flux density (Bs) of the second magnetic layer 3 is preferably 0.02 to 0.1 T, still preferably 0.03 to 0.08 T, particularly preferably 0.05 to 0.07 T. If Bs is less than the lower limit, the recording and reproducing output tends to be insufficient due to low intensity of magnetization. If Bs exceeds the upper limit, the demagnetization field upon recording becomes strong, which can lead to difficulty in obtaining a high output particularly in the middle to high frequency region.

The first magnetic layer 4 will now be described.

The first magnetic layer 4 is a top layer of the magnetic recording medium and contains acicular magnetic particles.

The acicular magnetic particles can be acicular ferromagnetic metal particles predominantly comprising iron, including ferromagnetic metal particles having a metal content of not less than 50% by weight, 60% by weight or more of the metal content being Fe. The ferromagnetic metal particles specifically include powder of an Fe alloy, e.g., Fe—Co, Fe—Ni, Fe—Al, Fe—Ni—Al, Fe—Co—Ni, Fe—Ni—Al—Zn, and Fe—Al—Si.

The acicular ferromagnetic metal particles preferably have a coercive force (Hc) of 120 to 240 kA/m, particularly 130 to 200 kA/m. If the coercive force of the ferromagnetic metal particles is less than the lower limit, the particles are liable to undergo demagnetization, resulting in a failure of obtaining high RF output at the short wavelength region. If it exceeds the upper limit, the magnetic field of the magnetic head is insufficient for writing, still less for overwriting.

The ferromagnetic metal particles preferably have a saturation magnetization ($\sigma$s) of 110 to 180 Am$^2$/kg, particularly 120 to 160 Am$^2$/kg. If the saturation magnetization is less than the lower limit, the recorded signals have reduced residual magnetization, and the output decreases. If it is more than the upper limit, the mutual interaction among individual magnetic particles become large. It follows that the magnetic particles get agglomerated, which deteriorates the surface properties, making it difficult to obtain a desired output.

Accordingly, the first magnetic layer 4 containing the acicular magnetic particles preferably has a coercive force (Hc) of 120 to 230 kA/m, particularly 140 to 200 kA/m, and a saturation flux density (Bs) of 0.3 to 0.45 T, particularly 0.32 to 0.4 T.

As stated above, it is preferred for the major axis length (r1) and acicular ratio (a1) of the acicular magnetic particles to be close to the major axis length (r2) and acicular ratio (a2) of the acicular nonmagnetic particles contained in the second magnetic layer 3. Specifically, r1 is preferably 50 to 500 nm, still preferably 50 to 100 nm; and a1 is preferably 3 to 20, still preferably 4 to 6. A preferred X-ray particle size of the acicular magnetic particles is 13 to 25 nm.

The acicular magnetic particles can be subjected to the same surface treatment as could be carried out on the tabular magnetic particles to be used in the second magnetic layer 3. If desired, the acicular magnetic particles can contain rare earth elements or transition metal elements.

The first magnetic layer 4 contains in addition to the above-described acicular magnetic particles, other components such as a binder, an abrasive, carbon powder, a lubricant, and a hardener. The first magnetic layer 4 is formed by coating the second magnetic layer 3 with a magnetic coating composition containing these components and a solvent (hereinafter referred to as a first magnetic coating composition). The details of these components and amounts thereof are the same as in the second magnetic layer 3, and the explanation given above with respect to the second magnetic layer 3 applies thereto appropriately.

The thickness of the first magnetic layer 4 (thickness $t_1$, see FIG. 1) is not greater than 0.3 μm, whereby a magnetic recording medium capable of high-density recording can be obtained. The lower limit of the thickness $t_1$ of the first magnetic layer 4 can be dropped to the absolute minimum because of the existence of a mixed magnetic region 6 hereinafter described. More specifically, the thickness $t_1$ can be reduced approximately to the minor axis length of the acicular magnetic particles, i.e., about 0.02 μm. A preferred range of the thickness of the first magnetic layer 4 is 0.02 to 0.3 μm, particularly 0.04 to 0.2 μm.

With respect to the other particulars of the first magnetic layer 4 which have not been described above, the explanation on the second magnetic layer 3 can apply appropriately.

The total thickness T of the magnetic layers as a whole (the total of $t_1$ (the thickness of the first magnetic layer 4), $t_2$ (the thickness of the second magnetic layer 3), and m (the thickness of the mixed magnetic region 6), see FIG. 1) is preferably 0.5 to 4 μm, still preferably 1 to 2 μm. In the present invention the languages "the thickness of a first magnetic layer" and "the thickness of a second magnetic layer" are intended to mean the respective thicknesses exclusive of the thickness of the mixed magnetic region, and the language "the total thickness of the magnetic layers" means the total thickness of all magnetic layers and the mixed magnetic region provided on a nonmagnetic substrate.

The magnetic recording medium according to the present invention preferably has a coercive force (Hc) of 120 to 250 kA/m, particularly 140 to 210 kA/m, and a saturation flux density (Bs) of 0.05 to 0.2 T, particularly 0.06 to 0.18 T.

The mixed magnetic region 6, which exists between the first magnetic layer 4 and the second magnetic layer 3 and typically characterizes the magnetic recording medium of the invention, will then be described.

The term "mixed magnetic region" as used herein denotes the region existing between the first magnetic layer 4 and the second magnetic layer 3 in which region the tabular magnetic particles originated in the second magnetic layer 3 and the acicular magnetic particles originated in the first magnetic layer 4 are present in a mixed state. The existence of the mixed magnetic region 6 with the specific thickness brings about a marked improvement in the output characteristics in the high to low frequency region and also reduces the surface roughness of the first magnetic layer 4.

In the mixed magnetic region 6, it is preferable that the tabular magnetic particles diffused from the second magnetic layer 3 and the acicular magnetic particles diffused from the first magnetic layer 4 be present in a ratio of 70/30 to 30/70 in terms of the number. This ratio can be determined by observing the transmission electron microscopic image of the cross section of a magnetic recording medium. Even if the tabular magnetic particles of the second magnetic layer 3 are excessively diffused into the first magnetic layer 4, as far as the ratio of such tabular magnetic particles in the first magnetic layer 4 is less than 30% by number, there is observed no substantial influences on the output or surface properties of a magnetic recording medium.

The thickness of the mixed magnetic region 6 is 1 to 20% based on the total thickness of the magnetic layers. If it is less than 1%, the improvement in output characteristics in the middle to high frequency region cannot be obtained. Neither is produced a buffering action against the surface roughening of the second magnetic layer 3 which results from the orientation of the tabular magnetic particles contained in the second magnetic layer 3 at a certain angle of tilt. On the other hand, if the thickness of the mixed magnetic region 6 exceeds 20%, the thickness of the first magnetic layer 4 or the second magnetic layer 3 is insufficient for securing sufficient output characteristics in the low to middle frequency region. A preferred thickness of the mixed magnetic region 6 for obtaining satisfactory output characteristics in the middle region is 1.5 to 10%, particularly 1.5 to 5%, of the total thickness of the magnetic layers. The method for measuring the thickness of the mixed magnetic region 6 will be described later in Examples.

The thickness m (see FIG. 1) of the mixed magnetic region 6 is selected appropriately so as to range from 1 to 20% of the total thickness of the magnetic layers. It is preferably 0.02 to 0.6 μm, still preferably 0.03 to 0.15 μm.

The boundary surface between the mixed magnetic region 6 and the first or second magnetic layers does not always need to be smooth. Since the mixed magnetic region 6 serves as a buffering region for the roughening of the surface of the second magnetic layer 3, the surface of the first magnetic layer 4 is kept smooth by this buffering action even if the boundary surfaces are not smooth.

The mixed magnetic region 6 also comprises the acicular nonmagnetic particles diffused from the second magnetic layer 3. The acicular nonmagnetic particles in the mixed magnetic region 6 are effective in (a) improving the compatibility of the acicular magnetic particles originated in the first magnetic layer 4 to stabilize the mixed magnetic region 6, (b) making it possible for the acicular magnetic particles and the tabular magnetic particles to be present in such a ratio as to improve the output characteristics in the low to high frequency region, and (c) preventing the tabular magnetic particles from excessively diffusing to the upper layer, i.e., the surface area of the first magnetic layer 4. In the mixed magnetic region 6, the ratio of the total number of the acicular magnetic particles and the tabular magnetic particles to the number of the acicular nonmagnetic particles (the former/the latter) is preferably 25/75 to 90/10, particularly 40/60 to 70/30.

While not limiting, the mixed magnetic region 6 can be formed by the following methods (1) to (3).

(1) The second magnetic coating composition and the first magnetic coating composition are simultaneously applied (wet-on-wet coating) and, immediately before magnetic field orientation, the coating layers are blown dry by warm air at 30 to 50° C. fed from above the first magnetic layer at a nozzle differential pressure of 5 to 100 mmAq/m-width (indicated as differential pressure between the inner pressure of the nozzle and the pressure of the drying chamber because of low amount of feed of warm air) of the stock web (this drying will be referred to as preliminary drying).

(2) The true density (g/ml) of the acicular magnetic particles used in the first magnetic layer 4 is made greater than that of each of the tabular magnetic particles and acicular nonmagnetic particles used in the second magnetic layer 3 by at least 0.6 [i.e., (true density of acicular magnetic particles—true density of tabular magnetic particles)≧0.6; (true density of acicular magnetic particles—true density of acicular nonmagnetic particles)≧0.6], and the weight ratio of the tabular magnetic particles to the acicular nonmagnetic particles in the second magnetic layer 3 is preferably set at 70/30 to 10/90, particularly 60/40 to 30/70.

(3) The pH of the tabular magnetic particles contained in the second magnetic layer 3 is made lower than that of the acicular magnetic particles contained in the first magnetic layer 4 by 1 or more, and the weight ratio of the tabular magnetic particles to the acicular nonmagnetic particles contained in the second magnetic layer 3 is preferably set at 70/30 to 10/90, particularly 60/40 to 40/60. These methods (1) to (3) will be hereunder described.

First, the method (1) will be described. A multi-layered magnetic recording medium of coated type is usually produced by simultaneously applying a second magnetic coating composition and a first magnetic coating composition by wet-on-wet coating, subjecting the coating layers while wet to a magnetic field orientation treatment, and then drying the coating layers. In this case, drying is preceded by orienting the tabular magnetic particles of the second magnetic layer in a magnetic field so that the tabular plane of the particles may be in the direction perpendicular to the plane of the medium (i.e., the axis of easy magnetization is in the horizontal direction). However, some of the tabular magnetic particles move as to bring their tabular plane parallel to the medium plane before the coating layers dry thoroughly. It follows that the tabular magnetic particles lose the unidirectionality in orientation, which impairs the magnetic characteristics of the second magnetic layer. Additionally cases are sometimes met with in which the tabular magnetic particles of the second magnetic layer and the acicular magnetic particles of the first magnetic layer are mixed to an excessive extent during the magnetic field orientation treatment and, in extreme cases, the tabular magnetic particles nearly reach the surface of the first magnetic layer, to give adverse influences to the magnetic characteristics.

Where the above-mentioned preliminary drying is carried out immediately before magnetic field orientation, the coating layers are dried with the tabular magnetic particles in the second magnetic layer being oriented to some extent in the perpendicular direction. As a result, the occurrence of the tabular magnetic particles' returning to the horizontal direction after magnetic field orientation can be reduced. Moreover, excessive diffusion of the tabular magnetic particles toward the first magnetic layer can be prevented. A mixed magnetic region having a suitable thickness can thus be formed.

What should be noted here is that, if the preliminary drying conditions are set so that the coating layers may dry sufficiently, it would be difficult to orient the tabular magnetic particles in the direction perpendicular to the medium plane in the subsequent magnetic field orientation. Likewise the tabular magnetic particles could not diffuse into the first magnetic layer moderately, failing to provide a mixed magnetic region. Therefore, the preliminary drying conditions must be selected so that the tabular magnetic particles may be oriented with their tabular plane substantially in the perpendicular direction to the medium plane and that the mixed magnetic region of suitable thickness may be formed. In order to obtain the output characteristics in the middle to high frequency region to a sufficient degree, in particular, as described above, the tabular magnetic particles should be oriented at an average angle of tilt of 70 to 90° with the medium plane. In addition, the thickness of the mixed magnetic region should be 1 to 20% of the total thickness of the magnetic layers. To meet these requirements, the preliminary drying are preferably conducted by blowing warm air at 35 to 50° C. (particularly 35 to 45° C.) from above the first magnetic layer at a nozzle differential pressure of 5 to 100 mmAq/m-width of the stock web immediately before magnetic field orientation, as described above. The term "from above the first magnetic layer" as used herein indicates "from the direction almost perpendicular to the surface of the first magnetic layer" (i.e., medium plane). A deviation of ±20° from the perpendicular is acceptable.

Next, the method (2) will be described. Where the method (2) is followed, the diffusion rate of the tabular magnetic particles and acicular nonmagnetic particles into the first magnetic layer and the diffusion rate of the acicular magnetic particles into the second magnetic layer become moderate. As a result, excessive diffusion of the tabular particles and acicular particles of the second magnetic layer into the first magnetic layer and of the acicular magnetic particles of the first magnetic layer to the second magnetic layer can be prevented, so that the thickness of the mixed magnetic region falls within 1 to 20% of the total thickness of the magnetic layers. The diffusion rates of the particles to the other layer become moderate when the true density (g/ml) of the acicular magnetic particles of the first magnetic layer is greater than the true density (g/ml) of each of the tabular magnetic particles and the acicular nonmagnetic particles of the second magnetic layer by at least 0.6, particularly 1.5 to 3.0. It is preferred that the true density of the tabular magnetic particles be not smaller than that of the acicular nonmagnetic particles in the second magnetic layer. In this case the mixing ratio of the tabular magnetic particles and the acicular magnetic particles in the mixed magnetic region becomes moderate to improve the output characteristics. Further, it is still preferred from the improvement in output characteristics in the middle frequency region that the weight ratio of the tabular magnetic particles to the acicular nonmagnetic particles in the second magnetic layer be 60/40 to 30/70. The true density of magnetic and nonmagnetic particles can be measured by a pycnometer method which is generally employed for measuring a true density of a substance.

Then, the method (3) will be described. Where the method (3) is followed, diffusion of the tabular magnetic particles of the second magnetic layer to the first magnetic layer can suitably be accelerated, and the mixing ratio of the tabular magnetic particles and the acicular magnetic particles coming from the first magnetic layer becomes moderate to provide a mixed magnetic region with its thickness falling within the above range. As a result, the output characteristics in the middle to high frequency region are improved. It is preferred for achieving the above object that the difference of pH between the tabular magnetic particles and the acicular magnetic particles be 1 to 6, particularly 2 to 5. The pH of the particles can be measured in accordance with pH measurement method A specified in JIS K-5101. In particular, an aqueous dispersion of the particles is boiled, and after cooling, the supernatant liquid is filtered through filter paper which has been well washed with water, and the pH of the filtrate is measured. For further improving the output characteristics in the middle frequency region, it is preferred that the weight ratio of the tabular magnetic particles to the acicular nonmagnetic particles in the second magnetic layer be 60/40 to 40/60.

While the methods (1) to (3) are each sufficiently effective in forming a mixed magnetic region, a combination of any two or all of them brings about enhanced effects. As stated above, while the above-described methods (1) to (3) are preferred, the method for forming a mixed magnetic region is not limited thereto and a magnetic medium according to the present invention may be obtained by conventional methods known to those of ordinary skill in the art without undue experimentation.

The nonmagnetic substrate 2 can be made of nonmagnetic materials, such as polymers. Suitable polymers include polyesters such as polyethylene terephthalate, polyethylene naphthalate, polybutylene terephthalate, polybutylene naphthalate, polyolefins, and polyamides. These polymers may be used either individually or as a combination of two or more thereof. If desired, the substrate made of these materials can be subjected to uniaxial or biaxial stretching or a corona discharge treatment. From the standpoint of film forming properties, strength, and cost, polyesters are preferred of the above-enumerated materials.

The thickness of the nonmagnetic substrate 2 is not particularly limited and can be selected appropriately depending on the use or form of the magnetic recording medium. For example, substrates used in magnetic recording media in the form of tapes or discs preferably have a thickness of 2 to 100 $\mu$m, particularly 2 to 30 $\mu$m.

The backcoating layer 5 which is provided, if desired, on the reverse side of the nonmagnetic substrate 2, can be formed by using any known backcoating composition comprising carbon powder and a binder with no particular limitation.

The magnetic recording medium 1 according to the embodiment shown in FIG. 1 is preferably produced as follows. The second magnetic coating composition for forming the second magnetic layer 3 and the first magnetic coating composition for forming the first magnetic layer 4 are applied simultaneously to the nonmagnetic substrate 2 in a wet-on-wet coating system to form coating layers corresponding to the first and second magnetic layers having the above-described thickness. In other words, the first magnetic layer is preferably provided while the second magnetic layer is wet.

Immediately before being subjected to magnetic field orientation, the coating layers are preliminarily dried as mentioned above to form the mixed magnetic region. After drying completely, the coated material is wound up. Thereafter, the coated material is calendered, and the backcoating layer 5 is provided. Alternatively, formation of the first and second magnetic layers may be preceded by formation of the backcoating layer 5. According to necessity, for example, in the production of magnetic tapes, the coated material is aged at 40 to 80° C. for 6 to 100 hours and then slit into a prescribed width.

The above-mentioned simultaneous coating technique in a wet-on-wet coating system is described, e.g., in Japanese Patent Laid-Open No. 73883/93, column 42, line 31 to column 43, line 31. This is a technique in which the first magnetic coating composition is applied before the second magnetic coating composition dries. Where this technique is adopted, there is provided a magnetic recording medium which causes few dropouts and can cope with high-density recording, the magnetic coating layers of which have excellent durability.

The magnetic field orientation treatment is performed before the first and second magnetic coating compositions dry completely. In the production of a magnetic tape, for instance, the orientation treatment can be carried out by applying a magnetic field of about 400 kA/m or higher, preferably about 80 to 800 kA/m, in parallel with the coated layer of the first magnetic coating composition or passing the coated material through a solenoid type magnet of about 80 to 800 kA/m while the first and second magnetic coating compositions are wet. The conditions of the preliminary drying preceding the magnetic field orientation are as described previously.

The complete drying of the coating layers is carried out by, for example, supplying gas heated to 30 to 120° C. The degree of drying can be controlled by adjusting the temperature and the feed rate of the gas.

The calendering of the coated material is carried out by, for example, supercalendering comprising passing the coated film between two rolls, such as a combination of a metal roll and a cotton roll or a synthetic resin roll, or a combination of two metal rolls. The calendering is performed at a temperature, e.g., of 60 to 140° C. under a linear pressure, e.g., of 1 to 5 kN/cm.

If desired, the coated film can be subjected to a finishing step, such as polishing or cleaning of the surface of the magnetic layer. It is also possible to form the first and second magnetic layers by a known successive coating technique.

While the magnetic recording medium according to the present invention has been described by referring to its preferred embodiments, it should be understood that the present invention is not limited thereto, and various changes and modifications can be made without departing from the spirit and scope of the present invention.

For example, the magnetic recording medium 1 of the embodiment shown in FIG. 1 may have a primer layer between the substrate 2 and the second magnetic layer 3 or the backcoating layer 5 or an additional magnetic layer for recording servo signals to cope with hard systems using long wavelength signals.

The magnetic recording medium of the present invention is suitable for use as magnetic tapes, such as a 8 mm video tape, a DAT tape, a DDS tape, a DLT tape, and a DVC tape, or magnetic discs, such as a flexible disk. It is also applicable as other types of magnetic recording media.

Having generally described the present invention, a further understanding can be obtained by reference to certain specific examples which are provided herein for purposes of illustration only and are not intended to be limiting unless otherwise specified. Unless otherwise noted, all the parts are by weight.

EXAMPLE 1

The following components except a hardener were kneaded in a kneader, dispersed in a stirrer, and further finely dispersed in a sand mill. The dispersion was filtered through a 1 $\mu$m filter, and finally, a hardener was added thereto to prepare a first magnetic coating composition, a second magnetic coating composition, and a backcoating composition having the respective compositions described below.

| First Magnetic Coating Composition: | |
| --- | --- |
| Acicular ferromagnetic metal powder predominantly comprising iron (Fe:Al:Ba:Si:Ni:Co = 88:2:1:1:3:5 (by weight); coercive force: 150 kA/m; saturation magnetization: 143 Am$^2$/kg; major axis length: 90 nm; acicular ratio: 5.5; BET specific surface area: 55 m$^2$/g; X-ray particle size: 15 nm; true density: 6.8 g/ml; pH: 9.5) | 100 parts |
| MR-104 (binder) (a trade name of a sulfate-group containing vinyl chloride polymer produced by Nippon Zeon Co., Ltd.) | 10 parts |
| UR-8300 (binder) (a trade name of a sulfoxyl-group containing polyurethane resin produced by Toyobo Co., Ltd.) | 5 parts (solid basis) |
| Alumina (abrasive) (average primary particle size: 300 nm) | 10 parts |
| Carbon black (average primary particle size: 25 nm) | 1 part |
| Myristic acid (lubricant) | 4 parts |
| Coronate L (hardener) (a trade name of polyisocyanate compound produced by Nippon Polyurethane Industry Co., Ltd.) | 4 parts (solid basis) |
| Methyl ethyl ketone (solvent) | 120 parts |
| Toluene (solvent) | 80 parts |
| Cyclohexanone (solvent) | 40 parts |
| Second Magnetic Coating Composition: | |
| Tabular ferromagnetic hexagonal barium ferrite powder Ba—F(A) (hexagonal tabular particles of barium ferrite substituted with Co, Zn and Ti; coercive force: 136 kA/m; saturation magnetization: 56 Am$^2$/kg; tabular diameter: 40 nm; aspect ratio: 4.4; BET specific surface area: 35 m$^2$/g; surface treatment with an Al—Si mixed system: 5 mass %; true density: 5.3 g/ml; pH: 7) | 50 parts |
| Acicular α-Fe$_2$O$_3$ powder (nonmagnetic particle) (major axis length: 150 nm; acicular ratio: 7; true density: 4.8 g/ml; BET specific surface area: 50 m$^2$/g) | 50 parts |
| MR-104 (binder) (a trade name of a sulfate-group containing vinyl chloride polymer produced by Nippon Zeon Co., Ltd.) | 10 parts |
| UR-8300 (binder) (a trade name of a sulfoxyl-group containing polyurethane resin produced by Toyobo Co., Ltd.) | 5 parts (solid basis) |
| Alumina (abrasive) (average primary particle size: 220 nm) | 5 parts |
| Carbon black (average primary particle size: 50 nm) | 5 parts |
| 2-Ethylhexyl stearate (lubricant) | 1.5 parts |
| Palmitic acid (lubricant) | 1.5 parts |
| Coronate L (hardener) (a trade name of polyisocyanate compound produced by Nippon Polyurethane Industry Co., Ltd.) | 5 parts (solid basis) |
| Methyl ethyl ketone (solvent) | 60 parts |
| Toluene (solvent) | 40 parts |
| Cyclohexanone (solvent) | 20 parts |
| Backcoating Composition: | |
| Carbon black (average primary particle size: 18 nm) | 40 parts |
| Carbon black (average primary particle size: 75 nm) | 1.5 parts |
| Nipporan 2301 (binder) (a trade name of polyurethane resin produced by Nippon Polyurethane Industry Co., Ltd.) | 20 parts (solid basis) |
| Celnova BTH 1/2 (binder) (a trade name of nitrocellulose produced by Asahi Chemical Industry Co., Ltd.) | 20 parts (solid basis) |
| D-250N (hardener) (a trade name of polyisocyanate produced by Takeda Chemical Industries, Ltd.) | 4 parts (solid basis) |
| Copper phthalocyanine | 5 parts |
| Stearic acid (lubricant) | 1 part |
| Methyl ethyl ketone (solvent) | 140 parts |
| Toluene (solvent) | 140 parts |
| Cyclohexanone (solvent) | 140 parts |

The second magnetic coating composition and the first magnetic coating composition were applied simultaneously onto a 6.5 μm thick polyethylene terephthalate substrate by means of a die coater to form the respective coating layers having the respective dry thicknesses shown in Table 1 below. Warm air at 45° C. from a nozzle set above the coating layers was applied to the coating layers at a nozzle differential pressure of 50 mmAq/m to preliminarily dry the coating layers. Immediately thereafter the coated film was passed through a solenoid type magnet of about 40 kA/m and then dried in a drying oven by applying hot air at 80° C. at a rate of 10 m/min. The coated film was then calendered to form first and second magnetic layers. The reverse side of the substrate was coated with the backcoating composition to a dry thickness of 0.7 μm and dried at 90° C. to form a backcoating layer. The coated film was slit into strips of ½ in. in width to obtain a magnetic tape having the layer structure shown in FIG. 1.

EXAMPLES 2 TO 11 AND COMPARATIVE EXAMPLES 1 TO 12

Magnetic tapes were produced in the same manner as in Example 1, except that the kinds and amounts of the acicular magnetic powder used in the first magnetic coating composition and the tabular magnetic powder and acicular nonmagnetic powder used in the second magnetic coating composition, the preliminary drying conditions, and the thicknesses of the first and second magnetic layers were changed according to Tables 1 through 4.

The tabular magnetic particles shown in Tables 1 to 4, Ba—F(B) to Ba—F(G), are all ferromagnetic hexagonal barium ferrite particles, except that the CoγFe$_2$O$_3$ used in Comparative Example 5 is not tabular particles but acicular particles of Co-adsorbed γ—Fe$_2$O$_3$. Therefore, the "tabular diameter" and "aspect ratio" in the column of Comparative Example 5 in Table 3 correspond to "major axis length" and "acicular ratio", respectively.

Each of the magnetic tapes obtained in Examples and Comparative Examples was observed with a transmission electron microscope (hereinafter abbreviated as TEM) to measure the thickness of the mixed magnetic region and the average angle of tilt of the tabular magnetic particles. The in-plane degree of orientation Sq in the longitudinal direction was measured likewise. The results obtained are shown in Tables 1 to 4. The thickness of the mixed magnetic region was measured as follows.

Method of Measurement of Mixed Magnetic Region Thickness:

a) In cases where the acicular magnetic particles in the first magnetic layer and the tabular magnetic particles and acicular nonmagnetic particles in the second magnetic layer are largely different in shape.

A TEM photograph (×40,000 to 100,000) was taken of the cross section of the magnetic tape. Ten acicular magnetic particles which had diffused farthest from the first magnetic layer to the second one were selected, and an average distance from the surface of the magnetic tape (i.e., the surface of the first magnetic layer) to the center of these particles was obtained, which was taken as distance A.

Likewise, 10 tabular magnetic particles which had diffused farthest from the second magnetic layer to the first one were selected, and an average distance from the surface of the magnetic tape (i.e., the surface of the first magnetic layer) to the center of these particles was obtained, which was taken as distance B. The thickness of the mixed magnetic region can be obtained by subtracting distance B from distance A. The proportion of the thickness of the mixed magnetic region can be obtained as the ratio of (the thickness of the mixed magnetic region) to (the total thickness of the magnetic layers). The thicknesses of the first and second magnetic layers were measured on the TEM photograph corrected for the magnification. The distance from the surface of the first magnetic layer down to the upper side of the mixed magnetic region (corresponding to distance B) was taken as the thickness of the first magnetic layer, while the distance from the lower side of the mixed magnetic region to the interface between the second magnetic layer and the substrate Was taken as the thickness of the second magnetic layer.

b) In cases where the acicular magnetic particles in the first magnetic layer and the tabular magnetic particles and acicular nonmagnetic particles in the second magnetic layer are similar in shape.

The cross section of the magnetic tape was observed under TEM in a scanning TEM mode (×40,000 to ×100,000). The individual particles were analyzed by XMA (X-ray microanalysis) and identified from the peaks inherent to the elements of each kind. Then, the thickness of the mixed magnetic region was obtained through the same procedures as in (a) above.

To evaluate the performance of the magnetic tapes obtained in Examples and Comparative Examples, the center-line average roughness Ra of the first magnetic layer, the outputs at 1F, 2F and 4F (hereinafter defined), the degree of dusting from the cut area in slitting, the color of dust from the cut area, and the contamination on the guide pins were examined as follows. The results are shown in Tables 1 to 4.

1) Center-line Average Roughness Ra

Measured with Laser Interferometric Microscope Maxim 3D Model 5700 (manufactured by Zygo) under the following conditions.
Lens: Fizeau Lens (Magnification=40 times)
Cut-off: 4.236 mm$^{-1}$ (Cut-off wavelength: 0.235 mm)
Removed: cylinder
Trimmed: 0

2) Output

The magnetic tape was run on a drive for data backup. Square wave signals having a recording frequency of 7 MHz (4F=7MHz, 2F=3.5 MHz, 1F=1.75 MHz) and a minimum recording wavelength of 0.33 μm were recorded on the tape with a fixed write head and reproduced with a read head, and the reproduction output was evaluated by a spectrum analyzer. The optimum recording current at 4F was used as a recording current. The number of samples n was 10.

3) Degree of Dusting from the Cut Area in Slitting

The first magnetic layer and the second magnetic layer are different in rigidity. The former tends to have higher rigidity than the latter. Since a shearing force and a tearing force are imposed locally on slitting, cracks are apt to initiate between the layers due to the difference in rigidity. The existence of a mixed magnetic region between the layers can reduce the cracking on slitting. Then, the dust on the cut area which adhered to a cleaning tape upon slitting was observed with the naked eye and scored on a scale of 1 to 5 to evaluate the effect of the mixed magnetic region. The higher the point, the more the dust.

4) Color of Dust from Cut Area

The acicular ferromagnetic metal powder used in the first magnetic layer is black, while hexagonal barium ferrite and α—$Fe_2O_3$ used in the second magnetic layer are brown. The color of the dust coming from the first magnetic layer and the second magnetic layer was observed with the naked eye and scored by making use of the above color difference. The higher the point, the blacker the dust, which indicates more dusting of the acicular ferromagnetic metal powder. Where the first and second magnetic layers are not distinguished in color, the ratio of the dust from the two layers can be obtained by XMA. The ratio of the dust from the first layer and the dust from the second layer ought to be the same as the thickness ratio of the first and second magnetic layers. If there is no mixed magnetic region, cracks would be generated between the two layers, and the first magnetic layer would generate more dust than expected from the thickness ratio. In this case, the dust coming from the two layers assumes a dark color.

5) Contamination on Guide Pins

The magnetic tape was wound and rewound on a drive repeatedly for 200 hours while varying the environmental conditions between 5° C., 30% RH and 45° C., 80% RH, making each cycle of environmental change in 3 hours. After the tape running, the contaminant on the guide pins, which was confirmed to comprise the contaminant on the surface of the tape and the dust from the cut edges, was observed.

TABLE 1

|  | Examples | | | | | |
|---|---|---|---|---|---|---|
|  | 1 | 2 | 3 | 4 | 5 | 6 |
| First Magnetic Layer: | | | | | | |
| Acicular magnetic particles | Fe-based metal powder | Fe-based metal powder | Fe-based metal powder | Fe-based metal powder | Fe-based metal powder | Fe-based metal powder |
| Amount(part) | 100 | 100 | 100 | 100 | 100 | 100 |
| Major axis length r1 (nm) | 90 | 90 | 90 | 90 | 90 | 90 |
| Acicular ratio a1t | 5.5 | 5.5 | 5.5 | 5.5 | 5.5 | 5.5 |
| True density (g/ml) | 6.3 | 6.3 | 6.3 | 6.3 | 6.3 | 6.3 |
| pH | 9.5 | 9.5 | 9.5 | 9.5 | 9.5 | 9.5 |

TABLE 1-continued

|  | Examples | | | | | |
| --- | --- | --- | --- | --- | --- | --- |
|  | 1 | 2 | 3 | 4 | 5 | 6 |
| Hc (kA/m) | 150 | 150 | 150 | 150 | 15 | 150 |
| σs (Am²(kg) | 143 | 143 | 143 | 143 | 143 | 143 |
| BET (m²/g) | 55 | 55 | 55 | 55 | 55 | 55 |
| Thickness (μm) | 0.2 | 0.2 | 0.2 | 0.2 | 0.2 | 0.2 |
| Ra (nm) | 4.6 | 6.0 | 5.0 | 5.2 | 5.5 | 4.9 |
| Second Magnetic Layer: | | | | | | |
| Tabular magnetic particles | Ba-F(A) | Ba-F(A) | Ba-F(A) | Ba-F(B) | Ba-F(B) | Ba-F(A) |
| Amount (part) | 50 | 65 | 30 | 50 | 50 | 50 |
| Tabular diameter (nm) | 40 | 40 | 40 | 60 | 60 | 40 |
| Aspect ratio | 4.4 | 4.4 | 4.4 | 5.0 | 5.0 | 4.4 |
| True density (g/ml) | 5.3 | 5.3 | 5.3 | 4.5 | 4.5 | 5.0 |
| pH | 7.0 | 7.0 | 7.0 | 8.0 | 8.0 | 7.0 |
| Hc (kA/m) | 136 | 136 | 136 | 139 | 139 | 136 |
| σs (Am²/kg) | 56 | 56 | 56 | 51 | 51 | 56 |
| BET(m²/g) | 35 | 35 | 35 | 45 | 45 | 35 |
| Acicular nonmagnetic particles | α-$Fe_2O_3$ | α-$Fe_2O_3$ | α-$Fe_2O_3$ | α-$Fe_2O_3$ | α-$Fe_2O_3$ | α-$Fe_2O_3$ |
| Amount (part) | 50 | 35 | 70 | 50 | 50 | 50 |
| Major axis length r2 (nm) | 150 | 150 | 150 | 150 | 150 | 230 |
| Acicular ratio a2 | 7 | 7 | 7 | 7 | 7 | 6 |
| True density (g/ml) | 4.8 | 4.8 | 4.8 | 4.8 | 4.5 | 4.8 |
| BET (m²/g) | 50 | 50 | 50 | 50 | 54 | 42 |
| Thickness (μm) | 1.5 | 1.3 | 1.5 | 1.4 | 1.3 | 1.5 |
| Preliminary Drying Temp. (° C.) | 45 | 45 | 45 | 45 | 45 | 45 |
| Thickness of Mixed Magnetic Area (%) | 2 | 10 | 1 | 5 | 13 | 2.2 |
| Average Angle of Tilt (°) | 90 | 90 | 90 | 90 | 90 | 90 |
| Major Axis Length Ratio (r2/r1) | 1.7 | 1.7 | 1.7 | 1.7 | 1.7 | 2.6 |
| In-Plane Degree of Orientation Sq (longitudinal direction) | 0.85 | 0.83 | 0.87 | 0.80 | 0.82 | 0.82 |
| 1F Output | 103 | 96 | 106 | 109 | 100 | 106 |
| 2F Output | 119 | 106 | 115 | 115 | 111 | 120 |
| 4F Output | 125 | 110 | 119 | 120 | 122 | 124 |
| Degree of Dusting from Cut Area | 1.5 | 0.5 | 2.5 | 0.5 | 0.5 | 1.5 |
| Color of Dust from Cut Area | 2.5 | 1.5 | 3 | 2 | 1.5 | 2.5 |
| Guide Pin Contamination | not observed | not observed | slightly observed | not observed | not observed | not observed |

TABLE 2

|  | Examples | | | | |
| --- | --- | --- | --- | --- | --- |
|  | 7 | 8 | 9 | 10 | 11 |
| First Magnetic Layer: | | | | | |
| Acicular magnetic particles | Fe-based metal powder | Fe-based metal powder | Fe-based metal powder | Fe-based metal powder | Fe-based metal powder |
| Amount (part) | 100 | 100 | 100 | 100 | 100 |
| Major axis length r1 (nm) | 90 | 90 | 90 | 90 | 90 |
| Acicular ratio a1 | 5.5 | 5.5 | 5.5 | 5.5 | 5.5 |
| True density (g/ml) | 6.3 | 6.3 | 6.1 | 6.3 | 6.3 |
| pH | 9.5 | 9.5 | 10.5 | 9.5 | 9.5 |
| Hc (kA/m) | 150 | 150 | 150 | 150 | 150 |
| σs (Am²/kg) | 143 | 143 | 143 | 143 | 143 |
| BET (m²/g) | 55 | 55 | 54 | 55 | 55 |
| Thickness (μm) | 0.3 | 0.3 | 0.3 | 0.3 | 0.2 |
| Ra (nm) | 5.5 | 3.6 | 4.9 | 5.6 | 4.9 |
| Second Magnetic Layer: | | | | | |
| Tabular magnetic particles | Ba-F(C) | Ba-F(B) | Ba-F(D) | Ba-F(A) | Ba-F(A) |
| Amount (part) | 50 | 50 | 50 | 20 | 50 |
| Tabular diameter (nm) | 40 | 60 | 40 | 40 | 40 |
| Aspect ratio | 4.4 | 5.0 | 4.2 | 4.4 | 4.4 |
| True density (g/ml) | 5.3 | 5.1 | 5.2 | 5.3 | 5.2 |
| pH | 8.0 | 8.0 | 5.5 | 7.0 | 7.0 |
| Hc (kA/m) | 138 | 139 | 139 | 136 | 136 |
| σs (Am²/kg) | 53 | 51 | 51 | 56 | 56 |
| BET (m²/g) | 37 | 45 | 39 | 35 | 35 |
| Acicular non magnetic particles | α-$Fe_2O_3$ | α-$Fe_2O_3$ | α-$Fe_2O_3$ | α-$Fe_2O_3$ | α-$Fe_2O_3$ |
| Amount (part) | 50 | 50 | 50 | 80 | 50 |

TABLE 2-continued

|  | Examples | | | | |
| --- | --- | --- | --- | --- | --- |
|  | 7 | 8 | 9 | 10 | 11 |
| Major axis length r2 (nm) | 150 | 120 | 120 | 150 | 150 |
| Acicular ratio a2 | 7.0 | 6.5 | 6.5 | 7.0 | 7.0 |
| True density (g/ml) | 4.8 | 4.5 | 4.5 | 4.8 | 4.8 |
| BET (m$^2$/g) | 50 | 53 | 53 | 50 | 50 |
| Thickness ($\mu$m) | 1.1 | 1.1 | 1.3 | 1.4 | 1.5 |
| Preliminary Drying Temp. (° C.) | 45 | 45 | 45 | 45 | 35 |
| Thickness of Mixed Magnetic Area (%) | 15 | 18 | 5 | 1.7 | 5 |
| Average Angle of Tilt (°) | 90 | 90 | 90 | 90 | 80 |
| Major Axis Length Ratio (r2/r1) | 1.7 | 1.3 | 1.3 | 1.7 | 1.7 |
| In-Plane Degree of Orientation | 0.83 | 0.85 | 0.85 | 0.83 | 0.80 |
| Sq (longitudinal direction) |  |  |  |  |  |
| 1F Output | 106 | 105 | 99 | 103 | 99 |
| 2F Output | 106 | 106 | 105 | 108 | 112 |
| 4F Output | 103 | 105 | 116 | 110 | 123 |
| Degree of Dusting from Cut Area | 0.5 | 0.5 | 1.5 | 1.5 | 0.5 |
| Color of Dust from Cut Area | 1.5 | 1.5 | 1.5 | 2.5 | 2 |
| Guide Pin Contamination | not observed | not observed | not observed | not observed | not observed |

TABLE 3

|  | Comparative Examples | | | | | |
| --- | --- | --- | --- | --- | --- | --- |
|  | 1 | 2 | 3 | 4 | 5 | 6 |
| First Magnetic Layer: |  |  |  |  |  |  |
| Acicular magnetic particles | Fe-based metal powder | Fe-based metal powder | Fe-based metal powder | Fe-based metal powder | Fe-based metal powder | Fe-based metal powder |
| Amount (part) | 100 | 100 | 100 | 100 | 100 | 100 |
| Major axis length r1 (nm) | 95 | 95 | 95 | 90 | 90 | 90 |
| Acicular ratio a1 | 5.5 | 5.5 | 5.5 | 5.5 | 5.5 | 5.5 |
| True density (g/ml) | 5.5 | 6.0 | 6.0 | 6.0 | 6.0 | 6.3 |
| pH | 8.5 | 8.5 | 8.5 | 9.5 | 9.5 | 9.5 |
| Hc (kA/m) | 145 | 145 | 145 | 145 | 145 | 150 |
| $\sigma$s (Am$^2$/kg) | 138 | 138 | 138 | 138 | 138 | 143 |
| BET (m$^2$/g) | 59 | 59 | 59 | 59 | 59 | 55 |
| Thickness ($\mu$m) | 0.2 | 0.2 | 0.2 | 0.2 | 0.2 | 0.2 |
| Ra (nm) | 6.3 | 6.5 | 6.4 | 9.2 | 6.0 | 7.6 |
| Second Magnetic Layer: |  |  |  |  |  |  |
| Tabular magnetic particles | Ba-F(E) | Ba-F(E) | Ba-F(A) | Ba-F(F) | Co $\gamma$ Fe$_2$O$_3$ | Ba-F(A) |
| Amount (part) | 50 | 8 | 75 | 50 | 50 | 50 |
| Tabular diameter (nm) | 40 | 40 | 40 | 5 | 230 | 40 |
| Aspect ratio | 4.4 | 4.4 | 4.4 | 1.5 | 7.0 | 4.4 |
| True density (g/ml) | 5.4 | 5.4 | 5.0 | 4.7 | 5.3 | 5.0 |
| pH | 6.8 | 6.8 | 7.0 | 6.4 | 7.5 | 7.0 |
| Hc (kA/m) | 136 | 136 | 136 | 103 | 127 | 136 |
| $\sigma$s (Am$^2$/kg) | 53 | 53 | 56 | 62 | 74 | 56 |
| BET (m$^2$g) | 37 | 37 | 35 | 90 | 50 | 35 |
| Acicular nonmagnetic particles | $\alpha$-Fe$_2$O$_3$ | $\alpha$-Fe$_2$O$_3$ | $\alpha$-Fe$_2$O$_3$ | $\alpha$-Fe$_2$O$_3$ | $\alpha$-Fe$_2$O$_3$ | $\alpha$-Fe$_2$O$_3$ |
| Amount (part) | 50 | 92 | 25 | 50 | 50 | 50 |
| Major axis length r2 (nm) | 150 | 150 | 150 | 150 | 150 | 90 |
| Acicular ratio a2 | 7 | 7 | 7 | 7 | 7 | 5 |
| True density (g/ml) | 4.5 | 4.8 | 4.8 | 4.8 | 4.8 | 4.5 |
| BET (m$^2$/g) | 54 | 50 | 50 | 50 | 50 | 54 |
| Thickness ($\mu$m) | 1.5 | 1.5 | 1.0 | 1.5 | 1.5 | 1.1 |
| Preliminary Drying Temp. (° C.) | 45 | 45 | 45 | 45 | 45 | 45 |
| Thickness of Mixed Magnetic Area (%) | 0.5 | 0.5 | 30 | 0.3 | 0.5 | 22 |
| Average Angle of Tilt (°) | 90 | 90 | 90 | 90 | — | 90 |
| Major Axis Length Ratio (r2/r1) | 1.6 | 1.6 | 1.6 | 1.7 | 1.7 | 1.0 |
| In-Plane Degree of Orientation | 0.83 | 0.83 | 0.80 | 0.68 | 0.85 | 0.79 |
| Sq (longitudinal direction) |  |  |  |  |  |  |
| 1F Output | 90 | 85 | 90 | 73 | 98 | 89 |
| 2F Output | 95 | 90 | 95 | 76 | 91 | 94 |
| 4F Output | 100 | 90 | 100 | 83 | 75 | 101 |
| Degree of Dusting from Cut Area | 3.5 | 3.5 | 0.5 | 3 | 3 | 0.5 |
| Color of Dust from Cut Area | 3.5 | 3.5 | 1.5 | 3.5 | 3.5 | 1.5 |
| Guide Pin Contamination | observed | observed | not observed | Observed | observed | not observed |

TABLE 4

| | Comparative Examples | | | | | |
|---|---|---|---|---|---|---|
| | 7 | 8 | 9 | 10 | 11 | 12 |
| First Magnetic Layer: | | | | | | |
| Acicular magnetic particles | Fe-based metal powder | Fe-based metal powder | Fe-based metal powder | Fe-based metal powder | Fe-based metal powder | Fe-based metal powder |
| Amount (part) | 100 | 100 | 100 | 100 | 100 | 100 |
| Major axis length r1 (nm) | 60 | 90 | 90 | 90 | 90 | 90 |
| Acicular ratio a1 | 5.0 | 5.5 | 5.5 | 5.5 | 5.5 | 5.5 |
| True density (g/ml) | 6.2 | 6.8 | 6.8 | 6.8 | 6.8 | 6.8 |
| pH | 10.0 | 9.5 | 8.5 | 8.5 | 9.5 | 9.5 |
| Hc (kA/m) | 154 | 150 | 154 | 154 | 150 | 150 |
| σs (Am$^2$/kg) | 135 | 143 | 138 | 138 | 143 | 143 |
| BET (m$^2$/g) | 52 | 55 | 58 | 58 | 55 | 55 |
| Thickness (μm) | 0.2 | 0.7 | 0.3 | 0.3 | 0.2 | 0.2 |
| Ra (nm) | 10.2 | 7.0 | 6.0 | 6.3 | 7.6 | 8.1 |
| Second Magnetic Layer: | | | | | | |
| Tabular magnetic particles | Ba-F(A) | Ba-F(A) | Ba-F(G) | Ba-F(A) | Ba-F(A) | Ba-F(D) |
| Amount (part) | 50 | 50 | 50 | 10 | 50 | 10 |
| Tabular diameter (nm) | 40 | 40 | 40 | 40 | 40 | 40 |
| Aspect ratio | 4.4 | 4.4 | 4.4 | 4.4 | 4.4 | 4.2 |
| True density (g/ml) | 5.3 | 5.3 | 4.9 | 5.2 | 5.1 | 5.2 |
| pH | 7.0 | 7.0 | 8.5 | 7.0 | 7.0 | 5.5 |
| Hc (kA/m) | 136 | 136 | 132 | 136 | 136 | 139 |
| σs (Am$^2$/kg) | 56 | 56 | 51 | 56 | 56 | 51 |
| BET (m$^2$g) | 35 | 35 | 37 | 35 | 35 | 39 |
| Acicular nonmagnetic particles | α-Fe$_2$O$_3$ | α-Fe$_2$O$_3$ | α-Fe$_2$O$_3$ | α-Fe$_2$O$_3$ | α-Fe$_2$O$_3$ | α-Fe$_2$O$_3$ |
| Amount (part) | 50 | 50 | 50 | 90 | 50 | 90 |
| Major axis length r2 (nm) | 300 | 150 | 150 | 150 | 150 | 150 |
| Acicular ratio a2 | 9 | 7 | 7 | 7 | 7 | 7 |
| True density (g/ml) | 4.9 | 4.8 | 4.8 | 4.8 | 4.8 | 4.8 |
| BET (m$^2$/g) | 34 | 50 | 50 | 50 | 50 | 50 |
| Thickness (μm) | 1.4 | 0.4 | 1.4 | 1.4 | 1.1 | 1.0 |
| Preliminary Drying Temp. (° C.) | 45 | 45 | 45 | 45 | not conducted | not conducted |
| Thickness of Mixed Magnetic Area (%) | 0.2 | 1.8 | 0.3 | 0.2 | 22 | 30 |
| Average Angle of Tilt (°) | 90 | 90 | 90 | 90 | 65 | 65 |
| Major Axis Length Ratio (r2/r1) | 5.0 | 1.7 | 1.7 | 1.7 | 1.7 | 1.7 |
| In-Plane Degree of Orientation Sq (longitudinal direction) | 0.78 | 0.83 | 0.84 | 0.82 | 0.75 | 0.69 |
| 1F Output | 91 | 98 | 91 | 88 | 70 | 72 |
| 2F Output | 90 | 95 | 90 | 90 | 82 | 80 |
| 4F Output | 84 | 95 | 84 | 90 | 90 | 84 |
| Degree of Dusting from Cut Area | 3 | 1.5 | 2.5 | 3 | 0.5 | 1.0 |
| Color of Dust from Cut Area | 3.5 | 2.5 | 3.0 | 3.5 | 2.0 | 2.0 |
| Guide Pin Contamination | observed | slightly observed | observed | observed | not observed | not observed |

As is apparent from the results in Tables above, it is seen that the magnetic tapes according to the present invention exhibit improved output characteristics in the middle to high frequency region and have reduced surface roughness on the first magnetic layer thereof, thereby showing satisfactory output characteristics in a full frequency range. It is obvious that these improvements owe to the mixed magnetic region which is provided with a suitable thickness between the second magnetic layer containing tabular magnetic particles and the first magnetic layer containing acicular magnetic particles and which comprises the tabular magnetic particles and the acicular magnetic particles diffused from these two layers at a suitable mixing ratio.

While not shown in Tables, the mixed magnetic region in each magnetic recording medium of Examples was found containing acicular nonmagnetic particles that had diffused from the second magnetic layer.

Obviously, numerous modifications and variations of the present invention are possible in light of the above teachings. It is therefore to be understood that within the scope of the appended claims, the invention may be practiced otherwise than as specifically described herein.

This application is based on Japanese Patent Application No. 9-213704 filed with the Japanese Patent Office on Aug. 7, 1997, the entire contents of which are hereby incorporated by reference.

What is claimed is:

1. A magnetic recording medium comprising a non-magnetic substrate having provided thereon a plurality of magnetic layers including a first magnetic layer provided as a top layer and a second magnetic layer adjoining said first magnetic layer, wherein said second magnetic layer comprises tabular magnetic particles and acicular non-magnetic inorganic particles and has a thickness of 0.5 to 2.5 μm, said tabular magnetic particles being oriented with their plane having the longest diameter tilted at an angle of 70 to 90 in average with the plane of the magnetic recording medium, said first magnetic layer comprises acicular magnetic particles and has a thickness of not greater than 0.3 μm, and a mixed magnetic region which comprises tabular magnetic particles and acicular magnetic particles, mixed together, and formed between said first magnetic layer and said second magnetic layer, a thickness of said mixed magnetic region being 1 to 20% of the total thickness of all said magnetic layers.

2. The magnetic recording medium according to claim 1, wherein a weight ratio of said tabular magnetic particles to said acicular nonmagnetic particles (the former/the latter) contained in said second magnetic layer is 70/30 to 10/90.

3. The magnetic recording medium according to claim 1, wherein an absolute difference between an acicular ratio (a1) of said acicular magnetic particles contained in said first magnetic layer and an acicular ratio (a2) of said acicular nonmagnetic particles contained in said second magnetic layer is within 3.

4. The magnetic recording medium according to claim 1, wherein a true density (g/ml) of said acicular magnetic particles contained in said first magnetic layer is greater than that of each of said tabular magnetic particles and said acicular nonmagnetic particles contained in said second magnetic layer by at least 0.6 g/ml.

5. The magnetic recording medium according to claim 1, wherein said first magnetic layer has a thickness of 0.02 to 0.3 $\mu$m, said second magnetic layer has a thickness of 0.5 to 2.0 $\mu$m, and a total thickness T of said magnetic layers is from 0.5 to 4 $\mu$m.

* * * * *